US010507730B2

(12) United States Patent
Grimes et al.

(10) Patent No.: US 10,507,730 B2
(45) Date of Patent: Dec. 17, 2019

(54) ELECTRIC VEHICLE CLOUD-BASED CHARGE ESTIMATION

(71) Applicant: FORD GLOBAL TECHNOLOGIES, LLC, Dearborn, MI (US)

(72) Inventors: Jeffery R. Grimes, Canton, MI (US); Navid Rahbari asr, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/788,584

(22) Filed: Oct. 19, 2017

(65) Prior Publication Data
US 2019/0118655 A1    Apr. 25, 2019

(51) Int. Cl.
*B60L 3/00* (2019.01)
*B60L 58/12* (2019.01)
(Continued)

(52) U.S. Cl.
CPC ............ *B60L 3/0046* (2013.01); *B60L 53/62* (2019.02); *B60L 53/68* (2019.02); *B60L 58/10* (2019.02); *B60L 58/12* (2019.02); *B60W 20/00* (2013.01); *B60L 2240/36* (2013.01); *B60L 2240/545* (2013.01); *B60L 2240/547* (2013.01);
(Continued)

(58) Field of Classification Search
CPC ............ B60L 3/0046; B60L 58/10–16; B60L 2240/36; B60L 2240/72; B60L 2240/12; B60L 2240/14–22; B60L 2240/26; B60L 2240/60–627; B60W 20/00;
(Continued)

(56) References Cited

U.S. PATENT DOCUMENTS

2003/0184307 A1* 10/2003 Kozlowski ............ B60L 3/0046
324/427
2013/0096751 A1   4/2013 Riley et al.
(Continued)

OTHER PUBLICATIONS

Habiballah Rahimi-Eichi et al.; Big-Data Framework for Electric Vehicle Range Estimation; Department of Electrical and Computer Engineering, North Carolina State University, NC, USA; pp. 1-7; IECON 2014.
(Continued)

*Primary Examiner* — Adam R Mott
(74) *Attorney, Agent, or Firm* — Brooks Kushman PC; David Kelley

(57) ABSTRACT

A hybrid electric vehicle (HEV) and method of operation, which include a battery and a communication unit, which are configured to periodically respond to a charge signal, and to adjust a charge time and battery recharge profile, according to a charge time estimate received from a remote fleet server. The charge time estimate is received in response to periodic operating conditions that are generated and communicated to the server. The operating conditions include one or more of charge station, environment, and location data, vehicle data, and battery performance data, among other data. The controller further configured to respond to a charge complete signal, and to generate and store as one of the battery performance parameters, an estimate error as a difference between the charge time estimate and an actual charge time. The controller readjusts a charge time and battery recharge profile, responsive to the estimate error.

17 Claims, 2 Drawing Sheets

(51) Int. Cl.
 | | |
 |---|---|
 | *B60L 53/68* | (2019.01) |
 | *B60L 53/62* | (2019.01) |
 | *B60L 58/10* | (2019.01) |
 | *B60W 20/00* | (2016.01) |

(52) U.S. Cl.
CPC ....... *B60L 2240/72* (2013.01); *B60L 2240/80* (2013.01); *Y10S 903/907* (2013.01)

(58) Field of Classification Search
CPC ....... Y10S 903/907; G07C 5/008; G07C 5/08; G07C 5/0016–0841
See application file for complete search history.

(56) References Cited

U.S. PATENT DOCUMENTS

| | | | |
|---|---|---|---|
| 2014/0336965 A1* | 11/2014 | Mori ................ | B60L 58/12 |
| | | | 702/63 |
| 2016/0347302 A1* | 12/2016 | Niwa ................ | B60L 11/1875 |
| 2017/0050527 A1 | 2/2017 | Tsuchiya | |
| 2018/0106868 A1* | 4/2018 | Sung ................ | B60L 3/12 |
| 2019/0202314 A1* | 7/2019 | Boeswald ........... | B60L 58/12 |

OTHER PUBLICATIONS

Habiballah Rahimi-Eichi et al.; Adaptive Parameter Identification and State-of-Charge Estimation of Lithium-Ion Batteries; North Carolina State University; 38th Annual Conference of the IEEE Electronics Society; pp. 1-7; Montreal, Canada, Oct. 25-28, 2012.

\* cited by examiner

ELECTRIC VEHICLE CLOUD-BASED CHARGE ESTIMATION

TECHNICAL FIELD

The disclosure relates to estimating charge times of electric vehicles utilizing remote server data analytics generated from real-time recharge performance data accumulated from vehicle fleets.

BACKGROUND

In electric and hybrid electric vehicles (HEVs), recharging of batteries is affected by the ambient environment, vehicle performance, charging station capabilities and performance, and other factors, which can introduce undesirable errors in charge time estimates. Such charge time estimate errors have persisted despite some attempts to improve accuracy. Some such attempts have been directed to predicting HEV range of operation estimates, predicting optimal charge station locations, and/or predicting real-time battery state of charge (SoC). Such attempts appear to have utilized known SoC calculating and look-up table algorithms, which seem to have been employed in different ways with controllers located on board the HEVs.

SUMMARY

Hybrid, plug-in hybrid, and battery electric vehicles (HEVs, PHEVs, BEVs) include a high voltage traction battery or batteries, which can be undesirably affected by inaccurate charge times. The disclosure is directed to improved systems and methods for more accurately estimating battery charge times, using among other capabilities, a cloud-based, neural network analytical SoC estimation capability. The new SoC estimation system receives and aggregates HEV battery and driver performance data from a global fleet of operating HEVs. The system is configured to ingest and digest this data, and to discover and utilize otherwise unknown patterns in SoC and battery charge performance to more accurately predict charge time estimates for any individual HEV.

The disclosure contemplates a battery charge estimation system that utilizes aggregated "big data" describing actual battery performance and driver behavior, which is analyzed by a remote, cloud server-based, deep-learning neural network engine and/or engines that is/are trained to discover otherwise unrecognizable patterns. The engine(s), predict/estimate battery SoC and charge times upon demand for any individual HEV in communication with the server, with improved accuracy.

In operation, HEVs in a global fleet, transmit location, environmental conditions, battery performance data, and charging station performance data, in real time to the remote server. The remote server retains recharge/charge-event data from the global EV fleet. The received and aggregated data is analyzed with the deep learning neural network to discover the hidden patterns between the data and the predicted and actual SoC and charge times. The neural network is trained to predict the SoC and/or recharge time for any HEV, which predicted SoC and/or charge time may be periodically updated in real-time and upon demand during recharge/charge events, to improve charge time estimates.

In configurations and methods of operation of the disclosure, an HEV/PHEV/BEV (hereafter referred to collectively as an "HEV") incorporates a controller that is, or controllers that are, coupled to a battery and a communication unit, which are configured to periodically monitor for and to respond to a charge signal from the HEV that indicates a charge/recharge event has commenced. The periodic monitoring and responses may be configured to occur at discrete time intervals, and/or when certain parameters change beyond a predetermined and/or preferred threshold.

The controller(s) adjust a charge time and a battery recharge profile, according to a charge time estimate, which estimate is received from a remote fleet server. The remote fleet server generates and sends the charge time estimate in response to an operating condition generated and communicated to the server by the HEV controller(s). The operation condition(s) include(s) various local HEV and charging station data, such as at least one of and/or one or more of charge station, environment, and location data, vehicle data, and battery performance data and parameters, among other data.

In further variations, the controller(s) are also further configured to respond to a charge complete signal, which indicates recharging of the HEV battery(ies) is/are complete. In response, the controller(s) generate and store, as one of the battery performance data and parameters, an estimate error that is calculated as a difference between the previously received charge time estimate and an actual charge time established when recharging is complete and the charge complete signal is generated. The estimate error is also communicated to the remote cloud-based global fleet server to enable the learning engines to improve prospective predictions of charge time estimates, according the various data and performance parameters accumulated during the current charge/recharge event.

In other modifications, the controller(s) are also configured to periodically and/or at the discrete time intervals, readjust the charge time and battery recharge profile, according to an updated charge time estimate, which is received by the communication unit from the remote fleet server. The remote fleet server sends the updated charge time estimate in response to and when the HEV controller(s) generate(s) and send(s) a new real-time operating condition, which also may include the estimate error. Such operating conditions and vehicle data may also further include vehicle identification number (VIN) and onboard diagnostic (OBD) codes and data, vehicle power, and climate control profile, among other data.

Additionally, the battery performance data and parameters may also include battery pack capacity and chemistry, battery state of health and charge, battery temperature, charge station power and performance, and low voltage battery status, among other data. The charge station data sent to the remote global fleet server may also include charge station power cost and capacity data, and charge station performance data generated and accumulated during the current charge event, only during the discrete time interval, and/or during intervals when various parameters change.

The disclosure contemplates the controller(s) further being configured to readjust the charge time and battery recharge profile, according to an initially determined and estimated charge time and a recharge profile that may be initially estimated when the vehicle is connected to a charge source from the capabilities of the charging source and the vehicle current conditions, and which may also be received from the remote fleet server, in response to the new operating condition generated and communicated to the server by the controller(s), and which may include the initially estimated and determined charge time and recharge profile being pushed from the remote fleet server to replace stored initial charge times and battery recharge profiles for all vehicles in the global fleet, when such updates are determined to be advisable.

The disclosure also includes methods of controlling the HEVs utilizing the described capabilities and improvements. For example, the methods include adjusting, by the controller(s), coupled to the battery and the communication unit, and periodically in response to a charge signal, the charge time and battery recharge profile. The adjusting is accomplished by the controller(s) according to the charge time estimate received from the remote fleet server. Adjusting the charge time is also accomplished in response to operating conditions generated periodically and/or at discrete time internals, and communicated to the server that include one or more of charge station, environment, and location data, vehicle data, and battery performance data and parameters, among other data and parameters.

Recharging of the HEV batteries is also controlled in response to the charge complete signal, with the controller(s) generating and storing as one of the battery performance data and parameters, the estimate error as the difference between the charge time estimate and the actual charge time. Readjusting the charge time and battery recharge profile is also accomplished by the controller(s) according to the updated charge time estimate received by the communication unit from the remote fleet server, which is also done in response to the operating conditions generated, to also include the estimate error, that are communicated to the server by the communication unit.

The disclosure also contemplates generating, by the controller(s). the operating conditions to include: the environment and location data to incorporate geographic location, and ambient temperature, humidity, and atmospheric pressure, the vehicle data to incorporate vehicle identification number and onboard diagnostic codes and data, vehicle power, and climate control profile, and the battery performance data and parameters to include battery pack capacity and chemistry, battery state of health and charge, battery temperature, charge station power and performance, and low voltage battery status, among other parameters and data.

These methods also may include readjusting, by the controller, the charge time and battery recharge profile, according to an updated charge time estimate received by the communication unit from the remote fleet server, and in response to the operating conditions generated and communicated to the server and including charge station data to include power cost and capacity data, and charge station performance data accumulated during a discrete time interval, as well as during the current charge event.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
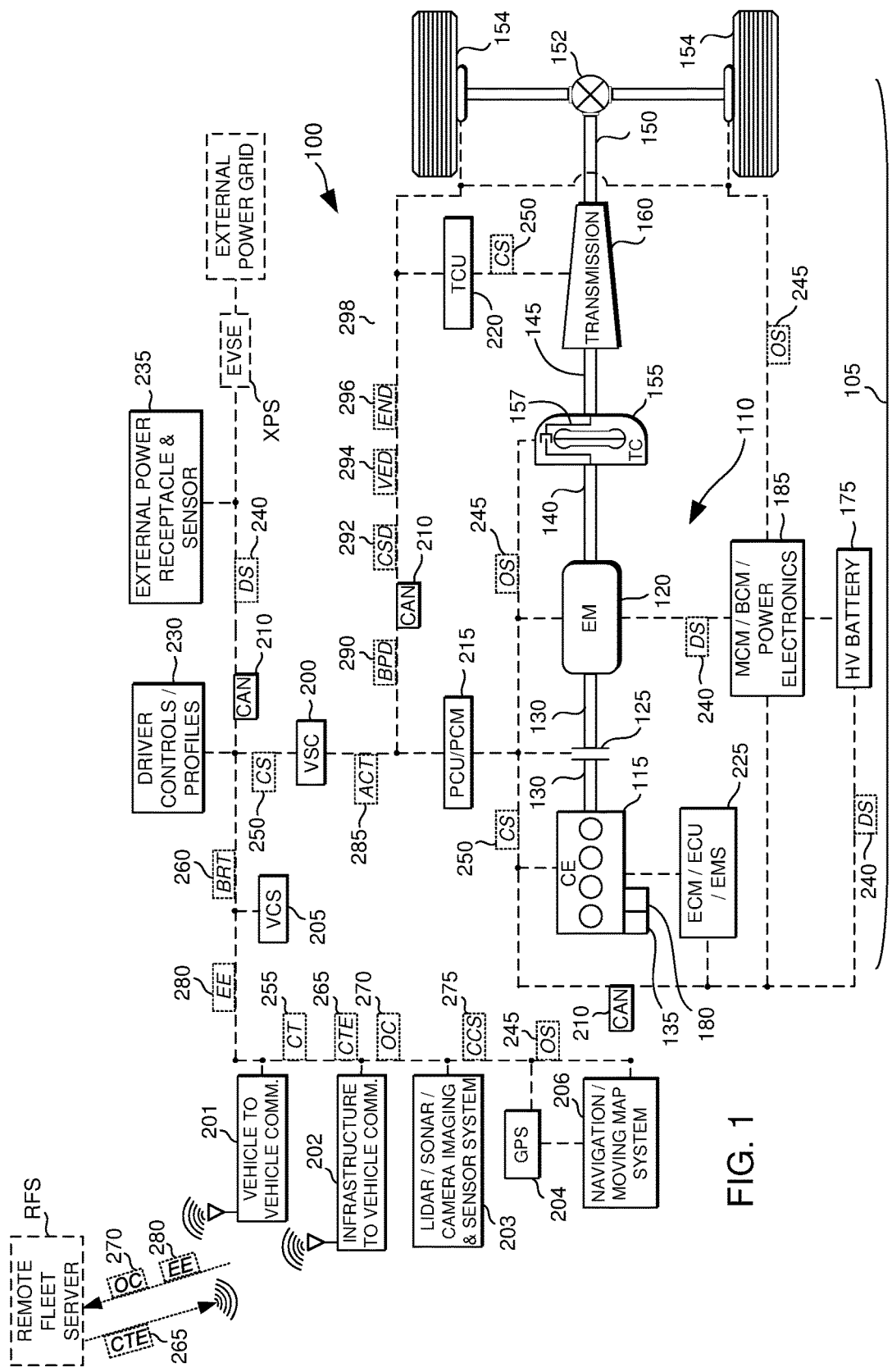
FIG. 1 is an illustration of a hybrid electric vehicle and its systems, components, sensors, actuators, and methods of operation.
Figure 2:
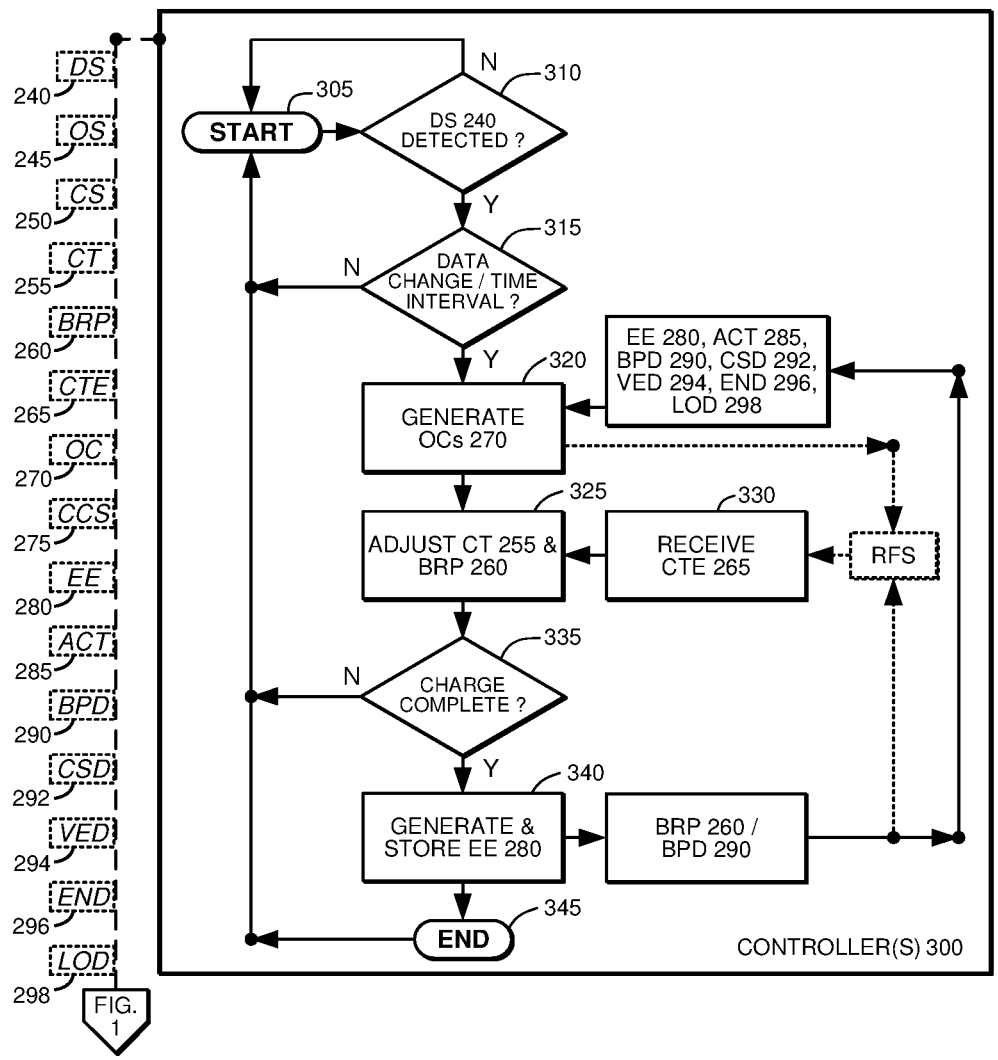
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a hybrid electric vehicle (HEV) 100 is shown, and illustrates representative relationships among components of HEV 100, which can also be a battery electric vehicle (BEV), a plug-in hybrid electric vehicle (PHEV), and combinations and modifications thereof, which are herein collectively referred to as an "HEV". Physical placement and orientation of the components within vehicle 100 may vary. Vehicle 100 includes a driveline 105 that has a powertrain 110, which includes a combustion engine (CE) 115 and an electric machine or electric motor/generator/ starter (EM) 120, which generate power and torque to propel vehicle 100. Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices (FEADs) described elsewhere herein. CE 115 is coupled to electric machine or EM 120 with a disconnect clutch 125. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM or electric machine 120 may assist engine 115 in a "hybrid electric mode" or an "electric assist mode" by transmitting additional power and torque to turn drive shafts 130 and 140. Also, EM 120 may operate in an electric only mode wherein engine 115 is decoupled by disconnect clutch 125 and which may be shut down, enabling EM 120 to transmit positive or negative (reverse) mechanical torque to EM drive shaft 140 in forward and reverse directions. When in a generator mode, EM 120 may also be commanded to produce negative electrical torque (when being driven by CE 115 or other drivetrain elements) and to thereby generate electricity for charging batteries and powering vehicle electrical systems, and while CE 115 is generating propulsion power for vehicle 100. EM 120 also may enable regenerative braking when in generator mode by converting rotational, kinetic energy from powertrain 110 and/or wheels 154 during deceleration, into negative electrical torque, and into regenerated electrical energy for storage, in one or more batteries 175, 180, as described in more detail below.

Disconnect clutch 125 may be disengaged to enable engine 115 to stop or to run independently for powering engine accessories, while EM 120 generates drive power and torque to propel vehicle 100 via EM drive shaft 140, torque converter drive shaft 145, and transmission output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154. Each or any such components may also be combined in part and/or entirely in a comparable transaxle configuration (not shown). Driveline 105 may be further modified to enable regenerative braking from one or any or all wheel(s) 154, using a selectable and/or controllable differential torque capability. Although FIG. 1 schematically depicts two wheels 154, the disclosure contemplates drive line 105 to include additional wheels 154.

The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105, such as between or as part of a torque converter and a transmission, and/or a transaxle, off-axis from the drive shafts, and/or elsewhere and in other arrangements. Still other variations are contemplated without deviating from the scope of the present disclosure. Driveline 105 and powertrain 110 also include a transmission that includes a torque converter (TC) 155, which couples engine 115 and EM 120 of powertrain 110 with and/or to a transmission 160. TC 155 may further incorporate a bypass clutch and clutch lock 157 that may also operate as a launch clutch, to enable further control and conditioning of the power and torque transmitted from powertrain 110 to other components of vehicle 100.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which are configured to convert and condition direct current (DC) power provided by high voltage (HV) battery 175 for EM 120.

MCM/BCM/power electronics 185 are also configured to condition, invert, and transform DC battery power into three phase alternating current (AC) as is typically required to power electric machine or EM 120. MCM/BCM 185/power electronics is also configured to charge one or more batteries 175, 180 with energy generated by EM 120 and/or front end accessory drive components, and to receive, store, and supply power from and to other vehicle components as needed. Such controllers, including for example, those incorporated with power electronics 185 are configured to monitor battery sensors to detect voltage, current, state-of-charge (SoC), charge the battery(ies), to adjust and control a charge-rate and charge-time therefor, to monitor and estimate charge time, to monitor recharging, and to discharge and deliver power from the battery(ies), among other capabilities.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

HEV 100 also may include VCS 205 to be the SYNC onboard vehicle computing and communications system manufactured by the Ford Motor Company (See, for example, U.S. Pat. No. 9,080,668). VCS 205 may include, be configured with, and/or cooperate with one or more communications, navigation, and other systems, units, controllers, and/or sensors, such as a vehicle to vehicle communications system (V2V) 201, and roadway and cloud-based network infrastructure to vehicle communication system (I2V) 202, a LIDAR/SONAR (light and/or sound detection and ranging) and/or video camera roadway proximity imaging and obstacle sensor system 203, a GPS or global positioning system 204, and a navigation and moving map display and sensor system 206.

Such communications systems, units, controllers, may be configured with, as, and be part of other communications units and enable bidirectional communications by wired and wireless communications that may include cellular, wireless ethernet and access points such as WiFi™ wireless capabilities, near field communications such as Bluetooth™, and many others. The VCS 205 can cooperate in parallel, in series, and distributively with VSC 200 and other controllers to manage and control HEV 100 and such other controllers, and/or actuators, in response to sensor and communication signals, data, parameters, and other information identified, established by, communicated to, and received from these vehicle systems, controllers, and components, as well as other systems external and/or remote to HEV 100.

While illustrated here for purposes of example, as discrete, individual controllers, MCM/BCM 185, VSC 200 and VCS 205 may control, be controlled by, communicate signals to and from, and exchange data with other controllers, and other sensors, actuators, signals, and components that are part of the larger vehicle and control systems, external control systems, and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, HEV 100 also may include a powertrain control unit/module (PCU/PCM) 215 coupled to VSC 200 or another controller, and coupled to CAN 210 and engine 115, EM 120, and TC 155 to control each powertrain component. A transmission control unit (TCU) 220 is also coupled to VSC 200 and other controllers via CAN 210, and is coupled to transmission 160 and also optionally to TC 155, to enable operational control. An engine control module (ECM) or unit (ECU) or energy management system (EMS) 225 may also be included having respectively integrated controllers and be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators, including for example without limitation, PCU 215, TCU 220, MCM/BCM 185, and/or ECU/EMS 225, among various others. For example, the controllers may communicate control commands, logic, and instructions and code, data, information, and signals to and/or from engine 115, disconnect clutch 125, EM 120, TC 155, transmission 160, batteries 175, 180, and MCM/BCM/power electronics 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers. Such control commands, logic, and instructions and code, data, information, signals, settings, and parameters, including driver preferred settings and preferences, may be captured and stored in, and communicated from a repository of driver controls and profiles 230.

For further example, various other vehicle functions, actuators, and components may be controlled by the controllers within and in cooperation with HEV 100 systems and components, and may receive signals from other controllers, sensors, and actuators, which may include, for purposes of illustration but not limitation, front-end accessory drive (FEAD) components and various sensors for battery charging or discharging, including sensors for detecting and/or determining the maximum charge, charge-state or state-of-charge (SoC), voltage and current, battery chemistry and life-cycle parameters, and discharge power limits, external environment ambient air temperature (TMP), pressure, humidity, and component temperatures, voltages, currents, and battery discharge power and rate limits, and other components. Such sensors are configured to communicate with the controllers and CAN 210 and may, for further example, establish or indicate ignition switch position (IGN), external environment temperature and pressure, engine and thermal management system sensors, charge receptacle sensors, and external power source voltage, current, and related data communications sensors, among others.

HEV 100 also includes at least one external power source receptacle and sensor 235, which is coupled with the various controllers, including for example BCM/MCM/power electronics 185 and HV battery 175. Receptacle 235 is utilized when HEV 100 is stationary and parked adjacent to an external power source (XPS) (FIG. 1), such as in a home, office, or other electrical power charging station or location, which stations are also known to those knowledgeable in the technology as electric vehicle supply equipment (EVSE). These controllers are configured to detect the presence of XPS when it is connected to receptacle 235, and to initiate a charging/recharging cycle or event of HV battery 175, battery 180, as well as enabling power to be supplied to HEV 100 for various purposes.

Such controllers may also enable bidirectional communication between HEV 100 and external XPS/EVSE to establish power capacity, cost of power, power use authorization, compatibility, and other parameters and information about and from the external XPS. Such communications between HEV 100 and external XPS may enable automated charging, purchase of power for a period of time, and may enable communication between external XPS and VSC 200 and VCS 205, as well as communication with remote systems external to HEV 100 and its various controllers. This configuration may further enable an occupant of HEV 100 to interact to convey power purchase authorization via a display in HEV 100. Additionally, HEV 100 may autonomously interact with both external XPS and one or more of VSC 200 and VCS 205 to communicate information to enable automated charging of HEV 100, and estimating of charge time, and communications of various vehicle and systems data and parameters to such external systems.

To enable charging of the HV battery(ies) 175 and/or other batteries, one or more of the controllers, such as those included with BCM/MCM/power electronics 185 are configured to detect external XPS being connected to receptacle 235, and to generate and communicate an external-power signal or direct-current charge-signal (DS) 240, which may include earlier described information indicating connection to XPS, power available from XPS, cost of such power, compatibility data, and use-authorization and authentication data, and related information. In response, the power electronics 185 and/or other controllers initiate charging at a charge-rate of the battery(ies) 175, 180 or others. Typically, the charge-rate and charge-time are initially estimated and determined when HEV 100 is initially connected to and/or plugged into XPS/EVSE. Such initial estimates and determinations are a function of the EVSE and power grid capabilities, as well as various parameters of HEV 100, including for example the current state-of-charge (SoC) of the respective battery(ies) 175. Both the initially estimated and determined charge-rate and the charge-time may be automatically changed by the controllers during charging operations and during normal use as possible life-cycle and performance changes occur in charge capacity and power transfer capability, which the controllers may detect in battery 175 and power electronics 185, and which RFS may estimate remotely for the global fleet of HEVs 100, as well as for the individual HEV 100.

As described and illustrated in the various figures, including FIGS. 1 and 2, the signals and data, including for example, external-power signal DS 240, and related control logic and executable instructions and other signals, and data can also include other signals (OS) 245, and control or command signals (CS) 250 received from and sent to and between controllers and vehicle components and systems. The external-power signal DS 240, OS 245, and CS 250, and other signals, related control logic and executable instructions, parameters, and data can and/or may be predicted, generated, established, received, communicated, to, from, and between any of the vehicle controllers, sensors, actuators, components, and internal, externals, and remote systems. Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated specifically in FIG. 2. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

With continuing reference to the various figures, including FIG. 1 the disclosure contemplates HEV 100 including at least one and/or one or more of the controller(s) coupled to the battery(ies) 175, 180, which controller(s) may be any of VSC 200, VCS 205, PCU 215, TCU 220, MCM/BCM 185, and/or ECU/EMS 225, and a communication unit or units, such as VSC 200, V2V 201, I2V 202, and/or VCS 205, any of which controllers are configured to generate and communicate charge signal DS 240. In response, the controller(s) adjust a charge time (CT) 255 and a battery recharge profile (BRP) 260, according to a charge time estimate (CTE) 265 received from a remote fleet server (RFS) that is external and remote to HEV 100. Such communications between the controller(s) of HEV 100 and RFS is and/or may be enabled via EVSE/XPS, and by other communications paths, connections, and/or capabilities. The adjusted CT 255 may be communicated and displayed and/or otherwise communicated to a driver in cooperation with VCS 205 or another controller or communication unit that enables display of the adjusted CT 255 within a cabin of HEV 100 and/or via a remote nomadic device or other mobile communications device.

CT 255 establishes how much time remains to complete the current charge/recharge event, and is calculated by the controller(s) as a function of, among other data and information, an operating condition (OC) 270, which includes one or more of charge station (XPS, EVSE) data, environment data, and location data, vehicle data such as current power and cooling demands, and battery performance data and parameters of BRP 260, as well as instantaneous operating parameters and data. Such parameters and data are generated, stored, and communicated by the respective controller(s) as described elsewhere herein, and also may be stored locally in HEV 100 in profiles repository 230. An initially determined CT 255 and subsequently adjusted CTs 255 may be time stamped and stored in and as adjustments to BRP 260, as the charge station and battery performance data, for each charge/recharge event, along with the other noted data and parameters (for example, voltages, currents, charge rates, temperatures, etc.) that may be utilized to generate CT 255.

For further examples, BRP 260 may include various battery charge/recharge profiles that may establish voltage, current, charge rates, and discharge rates, minimum and maximum limits for SoCs under various operating conditions and environmental circumstances, and battery state of health, any and all of which may change as lifecycle charge/recharge events accumulate. Also, BRP 260 may include such established rates for various types of home, public, and/or commercial charge stations XPS, EVSE, and may also include authentication, authorization, and/or payment data needed to enable automated, unattended, and/or manually initiated/operated charging events. In further examples, BRP 260 may also include HEV 100 power demands during such contemplated charge/recharge events to cool various components, as well as other HEV 100 power demands that may be driver initiated (for example, cabin cooling, media system use, interior lighting, etc.) or otherwise required to enable recharging. BRP 260 and other data, information, settings, and parameters, may be stored in, and communicated from the driver controls and profiles repository 230.

CTE 265 is received from RFS in response to OC 270 generated and communicated to RFS by the controller(s). CTEs 265 may also be time stamped and stored in BRP 260 for each charge/recharge event. CTE 265 identifies an estimate of how much time remains to complete the current charge/recharge event, which is established for the HEV 100 individually by RFS, but as a function of accumulated and aggregated data and parameters received by cloud-based RFS from a global fleet of similar and/or identical HEVs 100. The RFS includes remote big data analytics engines and computational resources, which may utilize neural network, artificial intelligence, and other analytical technologies to discover otherwise unrecognizable patterns in battery charge/recharge performance to enable improved determination of CTE 265 upon demand and in real-time.

Utilization of an off-board determined CTE 265, alone and/or in combination, with other HEV 100 local data to adjust CT 255, has been found to improve accuracy of CT 255, which is otherwise unavailable in view of the limited processing power and computing resources available on-board in most HEVs 100. Additionally, utilization of CTE 265 and the substantially greater resources of RFS, to adjust CT 255 without substantial on-board processing, reduces the consumption of such limited computational power and resources needed to accurately determine and adjust CT 255.

During charge events, and in response to a charge complete signal (CCS) 275, the controller(s) generate(s) and store(s) as one of the battery performance data and parameters, an estimate error (EE) 280, as a difference between CTE 265 and an actual charge time (ACT) 285. CCS 275 is generated by the controllers once the SoC of battery(ies) 175, 180 reaches a predetermined maximum limit, and may be established by any of the data contemplated in connection with that stored in BRP 260 and/or other controllers. CCS 275 and any other data, parameters, settings, and information may also be updated and revised by updates received from RFS, which may also be established in view of the accumulated and aggregated global fleet data received by RFS and analyzed to identify previously unknown battery charge/recharge event lifecycle performance patterns. Similar to other signals, settings, parameters, data, and information generated by the controller(s), each of EE 280 and/or ACT 285, and others, may be time-stamped and recorded and/or stored in BRP 260, in addition to being communicated to RFS and other systems and controllers.

In variations of the disclosure, the controller(s) also will readjust CT 255 and BRP 260 upon demand and/or at periodic time intervals that may be discrete time intervals, and/or time intervals established by changing HEV 100 parameters, such as for example without limitation, additionally required cooling for battery(ies) 175, 180, BCM 185, driver initiated power demands for cabin cooling, lighting, media system (SYNC) utilization, and other power needs. Any such periodic or discrete time intervals may be predetermined and/or automatically established by the controllers in response to HEV 100 performance characteristics, and multiple such intervals may be established and utilized for readjusting the various parameters, settings, CT 255, and/or BRP 260. Such intervals may, for example without limitation, be on the order of milliseconds, seconds, and greater units of time as may be suitable for use with the systems and components of HEV 100.

In other arrangements, an updated CTE 265 is received from RFS by the communication units VSC 200, V2V 201, I2V 202, and/or VCS 205. Such updated CTEs 265 may, during charge events, be pushed from RFS, received upon demand from HEV 100, and/or received real-time and/or periodically at the noted discrete time intervals and/or OC 270 change time intervals. As with other described adaptations of the disclosure, new and/or real-time OCs 270 are generated by the controller(s) and communicated to the server by such communication units. Further, in some variations, original, initial, new, and/or updated OCs 270 also include, embed, encode, and/or incorporate, and communicate EE 280 and ACT 285 to RFS, which enables RFS to further improve accuracy of CTEs 265, among other capabilities.

Further, in other variations of the disclosure, original, initial, new, and/or updated OCs 270 may include the battery performance data and parameters (BPD) 290, charge station data (CSD) 292, vehicle data (VED) 294, environmental data (END) 296, and/or location data (LOD) 298, which may also be stored in, received from, and/or communicated by profiles repository 230 and/or among the other controllers, and remotely with and by RFS. Battery performance data and parameters or BPD 290 may also include any of a variety of instantaneous and/or historical battery performance information of BRP 260 and other sensors and controllers, such as for purposes of example without limitation, battery pack capacity and chemistry, battery states of health and charge (SoH, SoC), battery temperature, low voltage battery status, charging and discharging voltages and currents, and charge and discharge rates, among other data.

The current and/or historical charge station data or CSD 292 for charge stations received by power receptacle and sensors 235 from XPS/EVSE), may further include charge station power and performance availability, charge station power cost and capacity data, and charge station performance data, among other data. Additional modifications of the disclosure include current and/or historical vehicle data or VED 294 including a vehicle identification number (VIN), power and cooling demands, vehicle power availability and demands, cabin climate control profile, onboard diagnostic (OBD) codes and data, vehicle power, and a climate control profile, among other data. In yet other adaptations, current and/or historical environment data or END 296 from controllers that may include VCS 200, VSC 205, may include ambient temperature, humidity, and atmospheric pressure, among other information. Current and/or historical geographic location data or LOD 298 may be obtained from GPS 204 and navigation system 206, among other controllers.

The disclosure contemplates additional modifications of the controller(s) configured to readjust CT 255 and BRP 260, according to an initially estimated and determined charge time and a recharge profile, which may be and/or is a function of the ESVE capabilities and current conditions of HEV 100, and which may also be and/or is received from RFS, in response to new OCs 270 generated and communicated to RFS by the controller(s) and/or communications unit(s). The initially estimated and determined charge time and a recharge profile may be pushed from RFS to replace stored initial, prior, and/or previous CTs 255 and BRPs 260 for all HEVs 100 in the global fleet, when such updates are determined to be advisable, such as when the engines of RFS discover new patterns and performance capabilities of fleet-wide battery(ies) performance from the continuously accumulated and aggregated data from each of the global fleet HEVs 100.

With continued reference to FIG. 1, and now also to FIG. 2, methods of operation of the disclosure include methods of controlling HEV 100. In view of the components, controllers, systems, and capabilities already described, such methods contemplate enabling such methods by the controller(s) designated here generally as controller(s) 300, and which may include for purposes of illustration but not for purposes of limitation, at least one of and/or one or more of controller(s) VSC 200, VCS 205, PCU 215, TCU 220, MCM/BCM 185, and/or ECU/EMS 225, as well as communication unit(s) VSC 200, V2V 201, 12V 202, and/or VCS 205.

The methods start at step 305, and at step 310 include detecting DS 240, and at step 315 detecting changes in charge/recharge event data or parameter and/or a time interval having elapsed, which causes at step 320 the controllers 300 to generate the OCs 270, and communicate them to RFS by EVSE and/or another communications path or connection. At step 325, in response to the detected DS 240 and intervals, the controller(s) 300 adjust CT 255 and BRP 260, according to CTE 265 received from RFS at step 330. The adjusted CT 255 may be communicated and reported to a driver in cooperation with VCS 205 or another controller or communication unit that enables display of the adjusted CT 255.

As with various other arrangements of the disclosure, the OCs 270 are generated periodically and/or at discrete time internals, and communicated to RFS including at least one and/or one or more of BPD 290, CSD 292, VED 294, END 296, and/or LOD 298, among other data and parameters. The disclosure also contemplates the methods including the recharging battery(ies) 175, 180 of HEV 100 being controlled in response to CCS 275, with controller(s) 300 at step 335 detecting whether charging is complete, and if not repeating the cycle of the methods and returning control to step 305, and if charging is complete, then at step 340 generating and storing as one of BPD 290, the EE 280 as the difference between CTE 265 and ACT 285. Further, such OCs 270 are generated and communicated to include at least one of and/or one or more of EE 280, ACT 285, BPD 290, CSD 292, VED 294, END 296, and/or LOD 298.

At step 345, the methods end the cycle and return control to start step 305 for continued monitoring and processing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller coupled to a battery and a communication unit, and configured to, in response to a charge signal:
adjust a charge time and battery recharge profile,
according to a charge time estimate received from a remote fleet server,
in response to an operating condition generated and communicated to the server, wherein the operating condition includes vehicle environment and location data that incorporates geographic location and at least ambient temperature, vehicle data that includes a vehicle identification, any onboard diagnostic codes, vehicle power, and a climate control profile, and battery performance data that includes battery pack capacity, battery state of charge, battery temperature, and charge station power; and
such that when charging completes a difference between the charge time estimate and an actual charge time is used to adjust a subsequent charge time estimate.

2. The vehicle according to claim 1, comprising:
the controller further configured to, in response to a charge complete signal:
generate and store as one of battery performance data, an estimate error that is the difference between the charge time estimate and the actual charge time.

3. The vehicle according to claim 2, wherein
the controller is further configured to, at discrete time intervals:
readjust the charge time and battery recharge profile,
according to an updated charge time estimate received by the communication unit from the remote fleet server, and
in response to a new real-time operating condition generated and communicated to the server by the communication unit and including the estimate error.

4. The vehicle according to claim 1, wherein
the controller is further configured to, at discrete time intervals:
readjust the charge time and battery recharge profile,
according to an updated charge time estimate received by the communication unit from the remote fleet server, and
in response to a new real-time operating condition generated and communicated to the server.

5. The vehicle according to claim 1, wherein
the controller is further configured to:
readjust the charge time and battery recharge profile,
according to an updated charge time estimate received by the communication unit from the remote fleet server, and
in response to a new real-time operating condition generated and communicated to the server and including vehicle data that incorporates a vehicle identification number and a climate control profile.

6. The vehicle according to claim 1, wherein
the controller is further configured to:
readjust the charge time and battery recharge profile,
according to an updated charge time estimate received by the communication unit from the remote fleet server, and
in response to a new real-time operating condition generated and communicated to the server and including charge station data that includes power cost and capacity data, and charge station performance data accumulated during a current charge event.

7. The vehicle according to claim 1 wherein
the controller is further configured to, at discrete time intervals:
readjust the charge time and battery recharge profile,
according to an updated charge time estimate received by the communication unit from the remote fleet server, and
in response to a new real-time operating condition generated and communicated to the server and including charge station data including power cost and capacity data, and charge station performance data accumulated during the discrete time interval.

8. The vehicle according to claim 1, wherein
the controller is further configured to:
adjust the charge time and battery recharge profile,
according to an initially determined charge time and a recharge profile received from the remote fleet server, and
in response to an operating condition generated and communicated to the server that includes one or more of charge station, environment, and location data, vehicle data, and battery performance data.

9. The vehicle according to claim 1, wherein
the controller further configured to, at discrete time intervals:
readjust the charge time and battery recharge profile, and
according to an initially determined charge time and a recharge profile received from the remote fleet server
in response to a new operating condition generated and communicated to the server.

10. A vehicle, comprising:
a controller coupled to a battery and a communication unit, and configured to periodically, in response to a charge signal:
adjust a charge time and battery recharge profile,
according to a charge time estimate received from a remote fleet server, and
in response to periodic operating conditions generated and communicated to the server that include one or more of charge station, environment, and location data, vehicle data, and battery performance data, wherein the environment and location data incorporate geographic location, and ambient conditions, wherein the vehicle data incorporate a vehicle identification and onboard diagnostic data, vehicle power, and a climate control profile, wherein the battery performance data incorporate battery pack capacity, battery state of health and charge, low voltage battery status, and battery temperature, and wherein the charge station data incorporate charge station power and performance, and low voltage battery status.

11. The vehicle according to claim 10, wherein
the controller is further configured to, in response to a charge complete signal:
generate and store as one of the battery performance data, an estimate error as a difference between the charge time estimate and an actual charge time.

12. The vehicle according to claim 11, wherein
the controller is further configured to:
readjust the charge time and battery recharge profile,
according to an updated charge time estimate received by the communication unit from the remote fleet server, and
in response to the operating conditions generated and communicated to the server by the communication unit and including the estimate error.

13. The vehicle according to claim 10, wherein
the controller is further configured to:
readjust the charge time and battery recharge profile,
according to an updated charge time estimate received by the communication unit from the remote fleet server, and
in response to the operating conditions generated and communicated to the server and including charge station data to include power cost and capacity data, and charge station performance data accumulated during a current charge event.

14. A method of controlling a vehicle, comprising:
by a controller, coupled to a battery, and
periodically in response to a charge signal:
adjusting a charge time and battery recharge profile,
according to a charge time estimate received from a remote fleet server, and
in response to periodic operating conditions generated and communicated to the server, which include one or more of charge station, environment and location data, vehicle data, and battery performance data, wherein the environment and location data incorporate geographic location, and ambient temperature, humidity, and atmospheric pressure, wherein the vehicle data incorporate vehicle identification number and onboard diagnostic codes and data, vehicle power, and a climate control profile, wherein the battery performance data incorporate battery pack capacity and chemistry, battery state of health and charge, battery temperature, and low voltage battery status, and wherein the charge station data incorporate charge station power and performance.

15. The method according to claim 14, further comprising:
by the controller, in response to a charge complete signal:
generating and storing as one of the battery performance data, an estimate error as a difference between the charge time estimate and an actual charge time.

16. The method according to claim 15, further comprising:
by the controller:
readjusting the charge time and battery recharge profile,
according to an updated charge time estimate received by a communication unit from the remote fleet server, and
in response to the operating conditions generated and communicated to the server by the communication unit and including the estimate error.

17. The method according to claim 14, further comprising:
by the controller,
readjusting the charge time and battery recharge profile, according to an updated charge time estimate received by a communication unit from the remote fleet server, and in response to the operating conditions generated and communicated to the server and including charge station data to include power cost and capacity data, and charge station performance data accumulated during a current charge event.

\* \* \* \* \*